United States Patent
Son et al.

(10) Patent No.: US 11,228,048 B2
(45) Date of Patent: Jan. 18, 2022

(54) AIR SUPPLY CONTROL METHOD AND CONTROL SYSTEM FOR FUEL CELL

(71) Applicants: Hyundai Motor Company, Seoul (KR); Kia Motors Corporation, Seoul (KR)

(72) Inventors: Ik Jae Son, Gyeonggi-do (KR); Yei Sik Jeon, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 208 days.

(21) Appl. No.: 16/172,800

(22) Filed: Oct. 28, 2018

(65) Prior Publication Data

US 2019/0363379 A1    Nov. 28, 2019

(30) Foreign Application Priority Data

May 24, 2018   (KR) .......................... 10-2018-0059230

(51) Int. Cl.
*H01M 8/04223* (2016.01)
*H01M 8/04089* (2016.01)
(Continued)

(52) U.S. Cl.
CPC ..... *H01M 8/04104* (2013.01); *H01M 8/0432* (2013.01); *H01M 8/0438* (2013.01); *H01M 8/04223* (2013.01); *H01M 8/04302* (2016.02); *H01M 8/04746* (2013.01); *H01M 8/2404* (2016.02)

(58) Field of Classification Search
CPC ........... H01M 8/04104; H01M 8/2404; H01M 8/04302; H01M 8/04223
See application file for complete search history.

(56) References Cited

U.S. PATENT DOCUMENTS

| 7,931,994 B2 | 4/2011 | Kamihara |
| 2004/0106026 A1 | 6/2004 | Fujita et al. |

(Continued)

FOREIGN PATENT DOCUMENTS

| JP | 2005150090 A | * 6/2005 |
| JP | 5379741 B2 | 12/2013 |

(Continued)

OTHER PUBLICATIONS

Yoshida et al., JP 2005150090 A, English Machine Translation, pp. 1-22 (Year: 2005).*

*Primary Examiner* — Tae-Sik Kang
(74) *Attorney, Agent, or Firm* — Mintz Levin Cohn Ferris Glovsky and Popeo, P.C.; Peter F. Corless

(57) ABSTRACT

An air supply control method of a fuel cell is provided. The method includes adjusting an opening of a pressure control valve in accordance with an opening map stored in advance. The pressure control valve is disposed at an outlet of a fuel cell of an air supply line for supplying air to the fuel cell and discharging air and adjusts air pressure in the air supply line. The method further includes determining whether an air pressure state of the air supply line is normal after adjusting the opening of the pressure control valve and operating the pressure control valve at a predetermined opening in response determining that the air pressure state of the air supply line is abnormal.

8 Claims, 5 Drawing Sheets

(51) Int. Cl.
  *H01M 8/04302* (2016.01)
  *H01M 8/2404* (2016.01)
  *H01M 8/0438* (2016.01)
  *H01M 8/04746* (2016.01)
  *H01M 8/0432* (2016.01)

(56) References Cited

U.S. PATENT DOCUMENTS

| | | | |
|---|---|---|---|
| 2014/0134508 A1 | 5/2014 | Ishikawa | |
| 2016/0141685 A1 | 5/2016 | Toida et al. | |
| 2017/0256806 A1 | 9/2017 | Ogawa et al. | |
| 2017/0355279 A1* | 12/2017 | Matsumoto | B60L 58/33 |

FOREIGN PATENT DOCUMENTS

| | | |
|---|---|---|
| KR | 10-2016-0142917 A | 12/2016 |
| KR | 10-1704223 B1 | 2/2017 |

\* cited by examiner

AIR SUPPLY CONTROL METHOD AND CONTROL SYSTEM FOR FUEL CELL

CROSS REFERENCE TO RELATED APPLICATION

The present application claims priority to Korean Patent Application No. 10-2018-0059230, filed May 24, 2018, the entire contents of which is incorporated herein for all purposes by this reference.

BACKGROUND

1. Field of the Disclosure

The present disclosure relates to an air supply control method and control system for a fuel cell and, more particularly, to a method and system for controlling air supply to maintain pressure difference between air outlet pressure and a hydrogen outlet pressure of a fuel cell.

2. Description of the Prior Art

A fuel cell is an energy conversion device that converts the chemical energy of fuel into electrical energy using electrochemical energy without converting the chemical energy into heat through combustion and is capable of being used for supplying power for industries, homes, and vehicles, and also for supplying power to small-sized electric/electronic products and portable devices.

In particular, in a polymer electrolyte membrane fuel cell (PEMFC) having high power density, a membrane-electrode assembly (MEA) that is a main component is disposed at the innermost position. The MEA is composed of a solid polymer electrolyte membrane capable of moving hydrogen ions and a cathode and an anode that are electrode layers plated with a catalyst to allow hydrogen and oxygen to react with each other on both sides of the electrolyte membrane. Accordingly, a fuel cell system includes a fuel cell stack that generates electrical energy through an electrochemical reaction, a hydrogen supply system that supplies hydrogen to the fuel cell stack, and an air supply system that supplies air including oxygen to the fuel cell stack, and further includes a heat management system that controls the operation temperature of the fuel cell stack.

The air supply system of fuel cell systems may be classified into a low-pressure operating type and a high-pressure operating type. A high-pressure operating air supply system includes an air compressor, which compresses air to supply air at a pressure greater than atmospheric pressure to the cathode of a fuel cell stack, and a pressure control valve that is disposed at the outlet of the fuel cell stack. However, when a fuel cell system is restarted after being stopped at a substantially low temperature, moisture in the fuel cell freezes and ice causes blockage in an air supply line that supplies air to the fuel cell stack and discharges air, Accordingly, the air pressure may be substantially increased compared to the normal state.

In particular, when there is no pressure sensor that measures air pressure of the air supply line at the outlet of the fuel cell stack, an increase in air pressure due to ice blocking is unable to be measured, and thus, the air pressure at the outlet of the fuel cell stack increases higher than the hydrogen pressure at an outlet, whereby hydrogen purge and condensate water drain are impossible. Therefore, air may flow backward to the hydrogen, the hydrogen concentration at the anode may be decreased due to reduction of the hydrogen purge amount, and the cell performance may be deteriorated or reverse voltage may be generated due to accumulation of condensate water.

However, since there is no pressure sensor at the fuel cell outlet of the air supply line, it is impossible to know whether the air pressure at the outlet of the fuel cell stack increases more than the hydrogen pressure at an outlet, and thus, the point of time to stop a cold driving mode and entering a normal driving mode is unclear. Accordingly, an increase of the air pressure of an air supply line is required to be sensed at the outlet of a fuel cell stack due to ice blocking even without a pressure sensor for measuring the air pressure of the air supply line at the outlet of the fuel cell stack, thereby being able to control the point of time for finishing cold driving.

The description provided above as a related art of the present disclosure is merely for helping to understand the background of the present disclosure and should not be construed as being included in the related art known by those skilled in the art.

SUMMARY

The present disclosure provides a technology of sensing an increase in air pressure of an air supply line at an outlet of a fuel cell stack due to ice blocking even without including a pressure sensor for measuring air pressure of the air supply line at the outlet of the fuel cell stack, thereby controlling a pressure control valve.

In accordance with an aspect of the present disclosure, an air supply control method of a fuel cell may include: adjusting an opening of a pressure control valve, which is disposed at an outlet of a fuel cell of an air supply line for supplying air to the fuel cell and discharging air and adjusting air pressure in the air supply line, in accordance with an opening map stored in advance; determining whether an air pressure state of the air supply line is normal after adjusting the opening of the pressure control valve; and operating the pressure control valve at a predetermined opening in response to determining that the air pressure state of the air supply line is abnormal.

The method may further include starting a fuel cell system in a cold state and then operating the fuel cell system in a cold driving mode before the adjusting the opening of a pressure control valve in accordance with an opening map stored in advance. In the operating in a cold driving mode, the pressure control valve may be operated at the predetermined opening.

The method may further include determining whether to adjust the opening of the pressure control valve in accordance with an opening map stored in advance based on the operation temperature of the fuel cell, after the operating in a cold driving mode. In addition, the opening map stored in advance may be stored based on air pressure in the air supply line that optimizes efficiency of the fuel cell system. In the determining of whether an air pressure state of the air supply line, whether an air compressor supplying air to the air supply line normally operates may be determined based on a performance map stored in advance.

Particularly, the performance map stored in advance may be a rotational speed map of the air compressor according to external air temperature and a required amount of air. When a difference between a current rotational speed of the air compressor and a rotational speed according to the performance map stored in advance is greater than a predetermined difference range, the air pressure state of the air supply line may be determined to be abnormal.

The method may further include stopping the cold operation mode and entering a normal operation mode when the air pressure state of the air supply line is determined as being normal, after the determining of whether an air pressure state of the air supply line is normal. In the operation of the pressure control valve at the predetermined opening, the predetermined opening may be a maximum opening of the pressure control valve.

In accordance with another aspect of the present disclosure, an air supply control method of a fuel cell may include adjusting opening of a pressure control valve, which is disposed at a fuel cell outlet of an air supply line supplying air to the fuel cell and discharging air and adjusting air pressure in the air supply line, in accordance with an opening map stored in advance; determining whether an air pressure state of the air supply line is normal based on an operation state of an air compressor according to a performance map stored in advance; and operating the pressure control valve at the predetermined opening in response to determining that the air pressure state of the air supply line is abnormal.

In accordance with another aspect of the present disclosure, an air supply control system of a fuel cell may include: an air supply line that supplies air to the fuel cell and discharges air; a pressure control valve disposed at an outlet of the fuel cell of the air supply line and that adjusts air pressure in the air supply line; and a controller configured to adjust opening of the pressure control valve in accordance with an opening map stored in advance, determine whether an air pressure state of the air supply line is normal, and adjusting the opening of the pressure control valve in accordance with an opening map stored in advance in response to determining that the air pressure state of the air supply line is abnormal.

The system may further include an air compressor disposed in the air supply line and that supplies air into the air supply line. The controller may be configured to determine whether the air pressure state of the air supply line is normal based on an operation state of the air compressor according to a performance map stored in advance.

According to the air supply control method and control system of a fuel cell, it may be possible to sense an increase in air pressure due to ice blocking during cold operation even without including a pressure sensor at the fuel cell stack outlet of the air supply line. Furthermore, it may be possible to prevent the problem that hydrogen purge is impossible or air flows backward to an anode. Additionally, condensate water drain may be enabled. It may be further possible to use whether the air pressure state of the air supply line is normal as a determination reference for stopping the cold driving mode and entering the normal driving mode.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
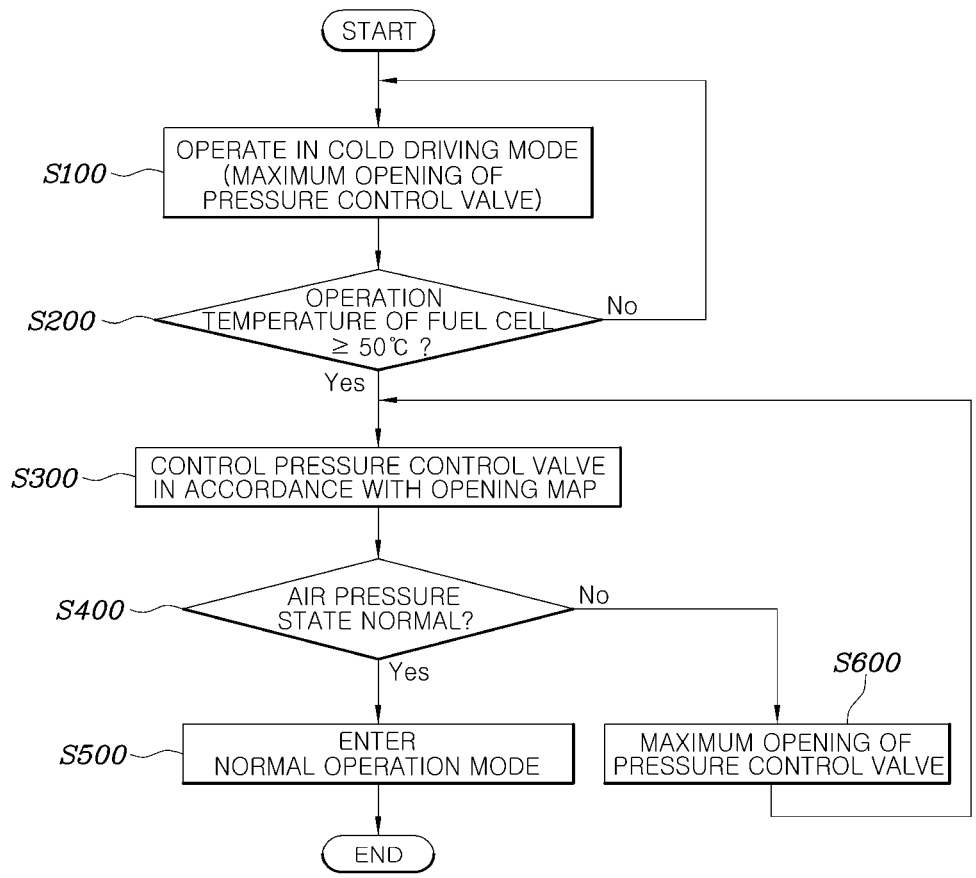
FIG. 1 is a flowchart showing a method of controlling air supply of a fuel cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A specific structural or functional description of exemplary embodiments of the present disclosure disclosed in the specification or application is given merely for the purpose of describing the exemplary embodiment according to the present disclosure. Therefore, the exemplary embodiments according to the present disclosure may be implemented in various forms, and the present disclosure should not be construed as being limited to the embodiments described in the specification or application.

Various changes and modifications may be made to the exemplary embodiments according to the present disclosure, and therefore particular embodiments will be illustrated in the drawings and described in the specification or application. However, it should be understood that exemplary embodiments according to the concept of the present disclosure are not limited to the particular disclosed exemplary embodiments, but the present disclosure includes all modifications, equivalents, and alternatives falling within the spirit and scope of the present disclosure.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i e. "between" and "merely between" or "neighboring" and "directly neighboring", should be interpreted similarly to the above description.

In the present specification, the terms are merely used to describe a specific embodiment, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that generally understood by a person skilled in the art to which the present disclosure belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, an exemplary embodiment of the present disclosure will be described in detail with reference to the accompanying drawings. Similar reference numerals presented in the drawings denote similar elements.

FIG. 1 is a flowchart showing a method of controlling air supply of a fuel cell according to an exemplary embodiment of the present disclosure. The method described herein below may be executed by a controller having a memory and a processor. Referring to FIG. 1, a method of controlling air supply of a fuel cell according to an exemplary embodiment of the present disclosure may include: adjusting an opening of a pressure control valve in accordance with an opening map stored in advance, wherein the pressure control valve is disposed at an outlet of a fuel cell of an air supply line that supplies air to the fuel cell and discharges air and the pressure control valve adjusts air pressure in the air supply line, (S300); determining whether an air pressure state of the air supply line is normal after adjusting the opening of the pressure control valve (S400); and operating the pressure control valve at a predetermined opening when determining that the air pressure state of the air supply line is abnormal (S600).

As in a control system to be described below, the air supply line supplies air to the fuel cell and discharges air. In particular, the air supply line supplies air to a cathode of a fuel cell stack and discharges air passing through the fuel cell stack to the outside. The pressure control valve may be disposed at the fuel cell outlet of the air supply line and the air pressure in the air supply line may be adjusted by changing the opening of the pressure control valve.

In the adjusting of the opening of a pressure control valve in accordance with an opening map stored in advance (S300), it may be possible to operate the pressure control valve in accordance with the opening map of the pressure control valve stored in a separate memory. In other words, it may be possible to operate the pressure control valve such that the air pressure in the air supply line becomes required air pressure as if a cold operation mode is stopped and a normal operation mode is entered.

In particular, the opening map stored in advance may be stored based on air pressure in the air supply line that optimizes the efficiency of the fuel cell system. The efficiency of the fuel cell system may be improved in a high-pressure operating type that compresses and supplies air to a fuel cell stack rather than a low-pressure operating type that maintains the pressure of the air that is supplied to the fuel cell stack at atmospheric pressure. Accordingly, an opening map that allows air pressure at a level where the efficiency of the fuel cell system is the maximum may be stored in advance. The fuel cell system may be designed such that the efficiency is optimized in consideration of required current of the fuel cell, the power consumption of the air compressor, etc.

In the determination of whether an air pressure state of the air supply line is normal (S400), the method may include determining whether the air pressure in the air supply line is within a normal range after the opening of the pressure control valve is adjusting, and accordingly, it may be possible to determine whether to enter the normal operation mode.

Whether the air pressure state in the air supply line is normal refers to whether the pressure of the air supply line at the fuel cell outlet is greater than the pressure of a hydrogen supply line at the fuel cell outlet. When the pressure of the air supply line at the fuel cell outlet is greater than the pressure of a hydrogen supply line at the fuel cell outlet, hydrogen purge or condensate water drain is impossible, which may cause the hydrogen purge amount to be reduced or air to flow backward to an anode or condensate water may be accumulated.

Further, in the operating of the pressure control valve at a predetermined opening (S600), in response to determining that the air pressure state of the air supply line is abnormal, it may be determined that the normal operation mode is unable to be entered, and thus, the pressure control valve may be operated at the predetermined opening as in the cold driving. The predetermined opening may be the maximum opening of the pressure control valve. Accordingly, it may be possible to sense an increase in air pressure due to ice blocking in cold driving even without including a pressure sensor at the fuel cell stack outlet of the air supply line.

Ice blocking causes the same effect as the closing of the pressure control valve due to ice generated in the fuel cell stack, in which the air pressure in the air supply line may be abnormally increased. Additionally, in the operating of the pressure control valve at a predetermined opening (S600), by maintaining the pressure control valve at the predetermining opening for a predetermined period of time and then adjusting the opening of the pressure control valve in accordance with an opening map stored in advance (S300), it may be possible to determine whether the air pressure state of the air supply line is normal (S400). The predetermined opening degree may be a full opening degree of the pressure control valve.

The method may further include, after determining whether the air pressure state of the air supply line is normal (S400), stopping the cold driving mode and entering a normal operation mode when the air pressure state of the air supply line is determined as being normal (S500). In the related art, the determination of whether to stop the cold driving mode was based on only the operation temperature of the fuel cell in the related art. However, in the claimed disclosure, the determination of whether to enter the normal driving mode, may be based on whether there is ice blocking, by additionally determining whether the air pressure state of the air supply line is normal. In other words, it may be possible to use an indication of whether the air pressure state of the air supply line is normal as a determination reference for stopping the cold driving mode and entering the normal driving mode.

The method may further include starting the fuel cell system in a cold state and then operating the fuel cell system in the cold driving mode (S100) before adjusting the opening of the pressure control valve in accordance with an opening map stored in advance (S300). When the fuel cell system is restarted in an environment with subzero external temperature, the fuel cell system may be operated in the cold driving mode after undergoing a cold start process. In the operating in a cold driving mode (S100), the pressure control valve may be operated at the predetermined opening.

Since ice blocking is expected in the cold driving mode, there is a possibility of an increase of the air pressure in the air supply line. Accordingly, it may be possible to operate the pressure control valve at the predetermined opening in the cold driving mode instead of in accordance with the pre-stored opening map. Accordingly, it may be possible to prevent the pressure of the air supply line at the fuel cell outlet from increasing to greater than the pressure of the hydrogen supply line at the fuel cell outlet in the cold driving mode in which ice blocking is expected.

The method may further include determining whether to adjust the opening of the pressure control valve in accordance with the opening map stored in advance based on the operation temperature of the fuel cell (S200), after the operating in the cold driving mode (S100). In other words, it may be possible to determine whether the operation temperature of the fuel cell is a preset temperature (e.g., about 50° C.) or higher, and then in response to determining that the operation temperature of the fuel cell has sufficiently increased, the opening of the pressure control valve may be adjusted in accordance with the opening map stored in advance.

The operation temperature of the fuel cell may be obtained by directly measuring the temperature inside the fuel cell stack, but, generally, it may be inferred by measuring the temperature of cooling water for cooling the fuel cell stack. In particular, the operation temperature of the fuel cell may be inferred by measuring the temperature of the cooling water at the outlet after the cooling water passes through the fuel cell stack.

In the related art, whether to stop the cold driving mode was determined based on only the operation temperature of the fuel cell. However, in the present disclosure, since the opening of the pressure control valve is additionally adjusted in accordance with the opening map stored in advance and then whether the air pressure state of the air supply line is normal is determined, it may be possible to monitor the air pressure in the air supply line.

Figure 2A:
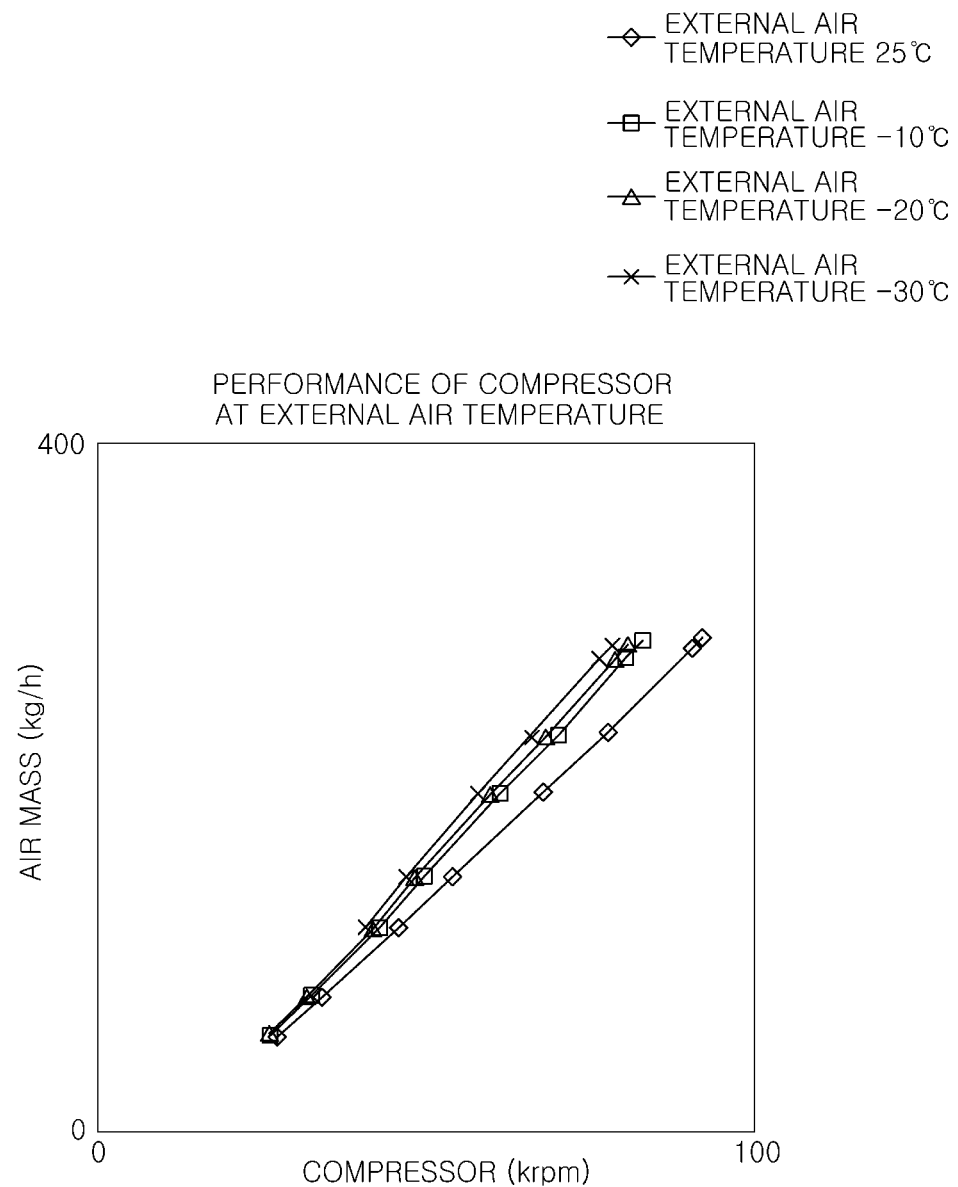
FIGS. 2A-2B are views showing a performance map of an air compressor according to an exemplary embodiment of the present disclosure.
Figure 2B:
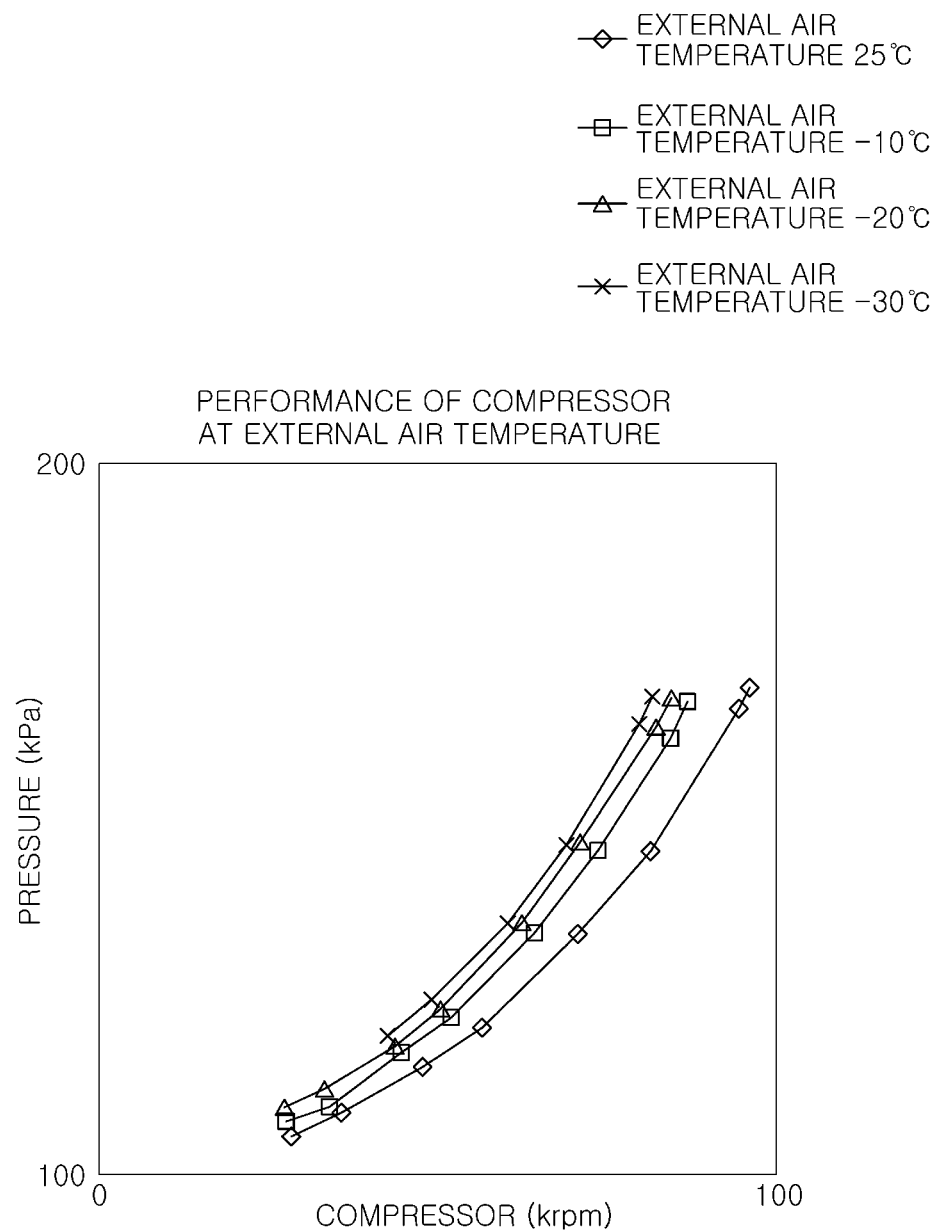
Figure 3:
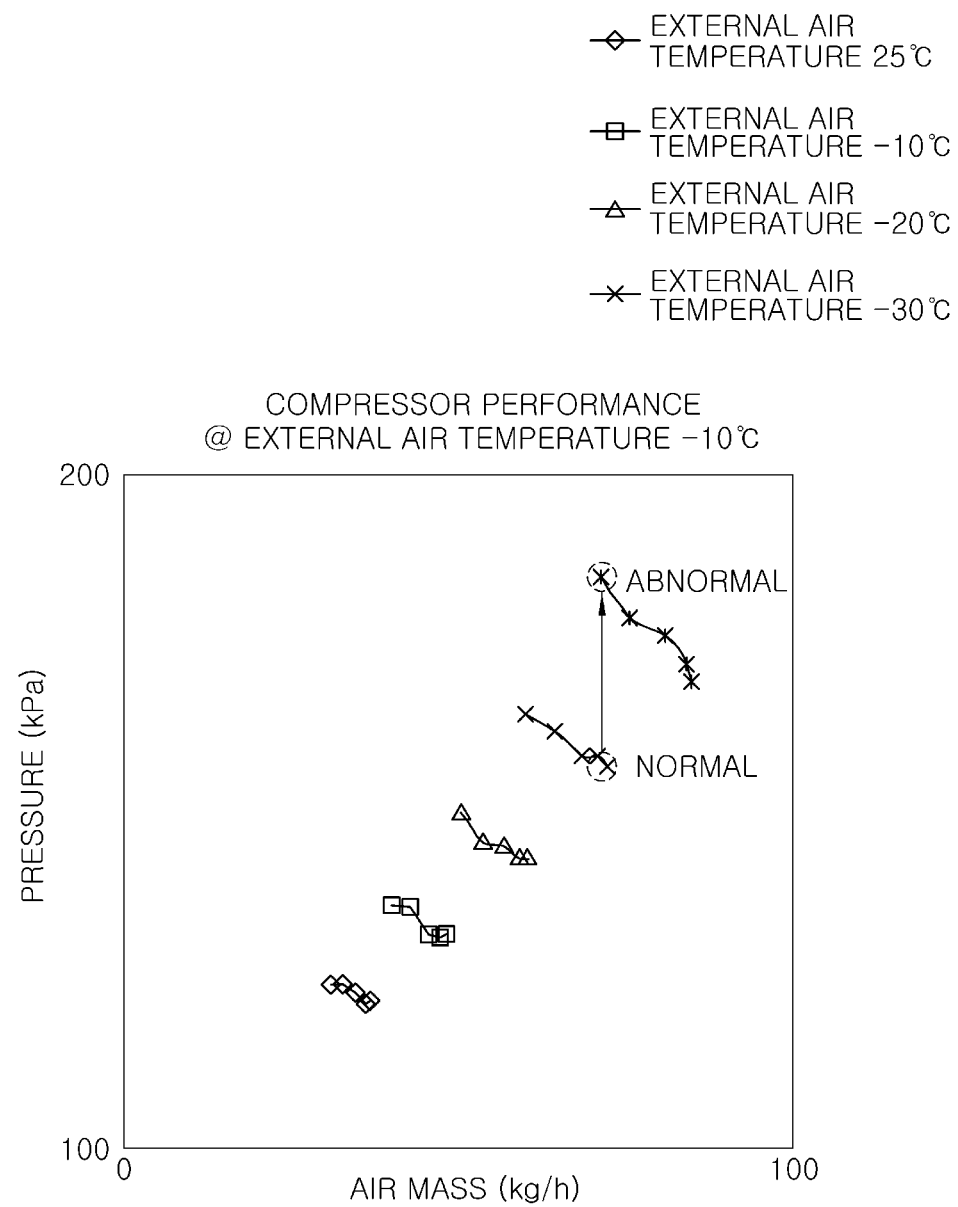
FIG. 3 is a view showing a normal state and an abnormal state of air pressure in an air supply line according to the performance map of the air compressor according to an exemplary embodiment of the present disclosure.

FIGS. 2A-2B are views showing a performance map of an air compressor according to an exemplary embodiment of the present disclosure and FIG. 3 is a view showing a normal state and an abnormal state of air pressure in an air supply line according to the performance map of the air compressor according to an exemplary embodiment of the present disclosure. Referring to FIGS. 2A-2B and 3, in the determining of whether the air pressure state of the air pressure line is normal (S400), it may be possible to determine whether the air compressor that supplies air to the air supply line normally operates based on a performance map stored in advance.

FIG. 2A is a graph showing air mass according to the rotational speed of an air compressor at external air temperature and FIG. 2B is a graph showing air pressure according to the rotational speed of the air compressor at external air temperature. Referring to FIGS. 2A-2B, the rotational speed of the air compressor, the air mass, and the air pressure are shown to be proportionate to one another and the performance of the air pressure is shown to be influenced by external air temperature.

FIG. 3 shows air pressure to air mass at rotational speed of the air compressor when external air temperature at which ice blocking is 10 degrees below zero. In other words, the performance map stored in advance in a memory may be a rotational speed map of the air compressor according to external temperature and a required amount of air.

The rotational speed of the air compressor may be adjusted to supply air mass required for the fuel cell stack. In particular, it may be possible to adjust the rotational speed of the air compressor to supply air mass required for the fuel cell stack, using an air mass sensor in the air supply line. Accordingly, in the determining of whether the air pressure state of the air supply line is normal (S400), it may be possible to compare the current rotational speed of the air compressor with a rotational speed according to the performance map stored in advance to determine the air pressure state.

As shown in FIG. 3, when the rotational speed of the air compressor is adjusted to supply air mass required for the fuel cell stack, it may be possible to determine the pressure of the air supply line based on the rotational speed of the air compressor. In other words, when the rotational speed of the air compressor for supplying a predetermined air mass to the fuel cell stack is normal, it may be 80[krpm], and when the rotational speed of the air compressor is 90[krpm], the air pressure in the air supply line may be abnormally increased.

When the current rotational speed of the air compressor is greater than the rotational speed of the air compressor according to the performance map stored in advance for supplying the amount of air required for the fuel cell stack, with the opening of the pressure control valve operated in accordance with the opening map stored in advance, it may be possible to determine that the air pressure in the air supply line has increased. Accordingly, it may be possible to determine that there is a possibility that the air pressure may increase to be greater than the pressure at the fuel cell stack outlet of the hydrogen supply line.

Accordingly, in the determination of whether the air pressure state of the air supply line is normal (S400), when the difference between the current rotational speed of the air compressor and the rotational speed according to the performance map stored in advance is greater than a predetermined difference range, the air pressure state of the air supply line may be determined to be abnormal. The predetermined difference range, for example, may be set at 3[krpm] in consideration of the relationship between air pressure and hydrogen pressure, and it may be changed in accordance with external air temperature or the amount of air required from the fuel cell stack.

Consequently, the air supply control method of a fuel cell according to an exemplary embodiment of the present disclosure may adjust the opening of the pressure control valve, which is disposed at the fuel cell outlet of the air supply line supplying air to the fuel cell and discharging air and adjusts the air pressure in the air supply line, in accordance with the opening map stored in advance. Additionally, the method may determine whether the air pressure state of the air supply line is normal based on the operation state of the air compressor according to a performance map stored in advance and then may operate the pressure control valve at the predetermined opening when determining that the air pressure state of the air supply line is abnormal. The hydrogen pressure in a hydrogen line for supplying hydrogen to the fuel cell stack may be adjusted based on a map stored in advance according to the difference from the air pressure in the air supply line. In particular, the hydrogen pressure may be adjusted based on the following:

0<hydrogen outlet pressure−air inlet pressure≤5 kPa (minimum target pressure of 110 kPa or less)

Hydrogen purge and drain are influenced by the difference between hydrogen outlet pressure and air outlet pressure, but hydrogen purge and condensate water drain may be prevented by increasing the hydrogen outlet pressure higher than the air inlet pressure. For the hydrogen pressure, the pressure difference of the hydrogen supply line between the fuel cell stack inlet and outlet may be reflected in accordance with a map. Additionally, for the air inlet pressure, a tube side pressure difference of a humidifier may be reflected to the performance map of the air compressor in accordance with a map. For the air outlet pressure, the tube side pressure difference of the humidifier and the pressure difference between the fuel cell stack inlet and outlet may be reflected to the performance map of the air compressor in accordance with a map.

Figure 4:
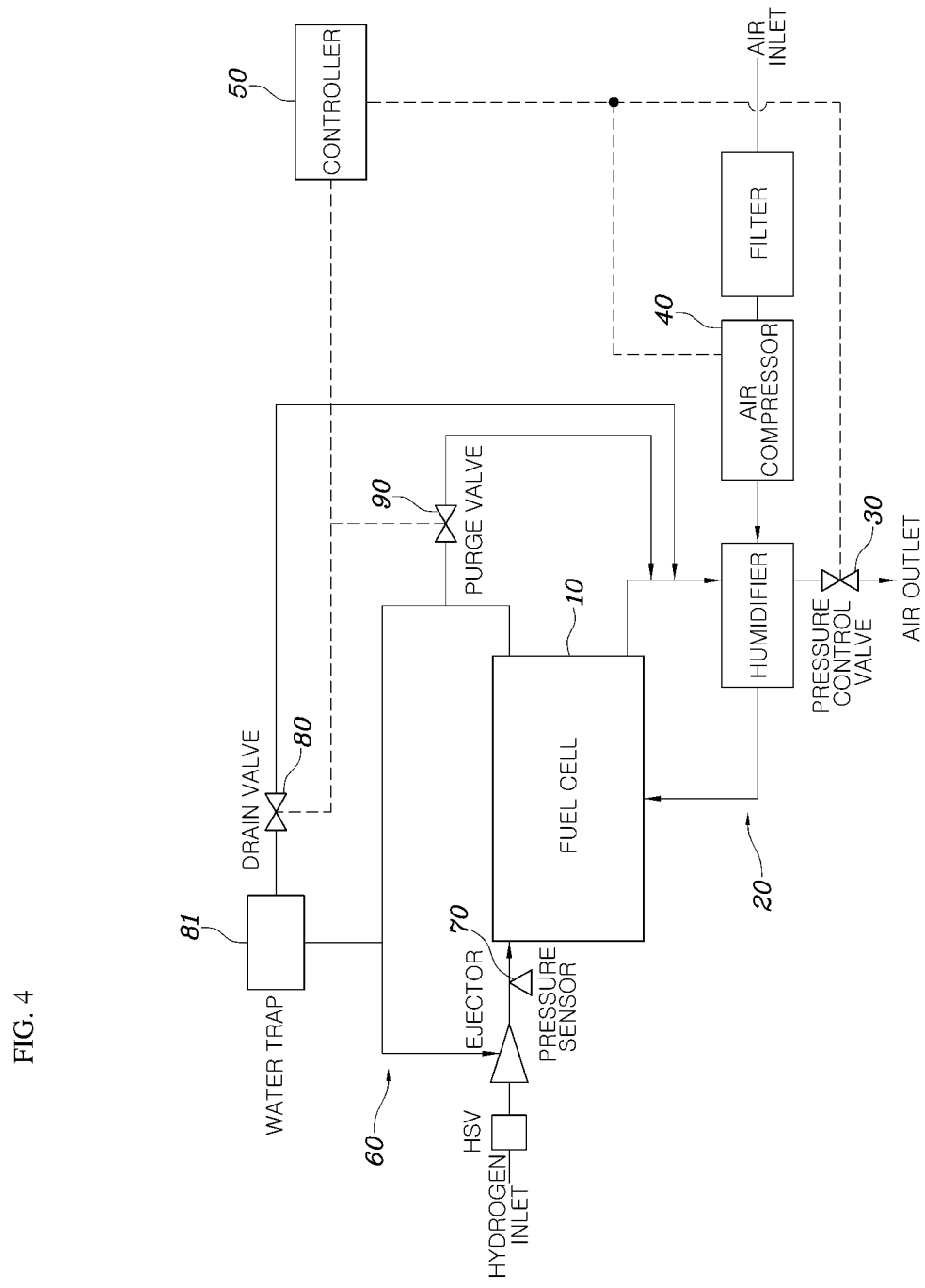
FIG. 4 is a view showing the configuration of an air supply control system of a fuel cell according to an exemplary embodiment of the present disclosure.

FIG. 4 is a view showing the configuration of an air supply control system of a fuel cell according to an exemplary embodiment of the present disclosure. Referring to FIG. 4, an air supply control system of a fuel cell 10 according to an exemplary embodiment of the present disclosure may include: an air supply line 20 that supplies air to the fuel cell 10 and discharges air; a pressure control valve 30 that is disposed at an outlet of the fuel cell 10 of the air supply line 20 and adjusts air pressure in the air supply line 20; and a controller 50 configured to adjust the opening of the pressure control valve 30 in accordance with an opening map stored in advance, determine whether the air pressure state of the air supply line 20 is normal, and operate the pressure control valve 30 at the predetermined opening when determining that the air pressure state of the air supply line 20 is abnormal.

The system may further include an air compressor 40 that is disposed in the air supply line 20 and supplies air into the air supply line 20. The controller 50 may be configured to determine whether the air pressure state of the air supply line 20 is normal based on the operation state of the air compressor 40 according to a performance map stored in advance.

The air supply line 20 supplies air to the fuel cell 10, in detail, to a cathode of the fuel cell stack. A hydrogen circulation line 60 supplies air to an anode of the fuel cell stack. The hydrogen circulation line 60 supplies and circulates hydrogen to the fuel cell 10. The hydrogen circulation line 60 may be connected to a hydrogen tank through a hydrogen supply valve and may supply hydrogen circulating through the fuel cell 10 and hydrogen supplied from the hydrogen tank back to the fuel cell 10 using an ejector. A pressure sensor 70 may be disposed between the fuel cell 10 and the ejector in the hydrogen circulation line 60.

Furthermore, a purge valve 90 for purging hydrogen to the outlet of the fuel cell 10 of the air supply line 20 may be disposed at the outlet of the fuel cell 10 of the hydrogen circulation line 60. A water trap 81 that maintains condensate water produced in the fuel cell 10 may be disposed at the outlet of the fuel cell 10 of the hydrogen circulation line 60 and may be connected to the outlet of the fuel cell 10 of the air supply line 20, and a drain valve 80 may be disposed therebetween. Air passing through a filter and compressed by the air compressor 40 may be supplied to the fuel cell 10 through the air supply line 20 after passing through a humidifier. The air discharged from the fuel cell 10 may be discharged through the air supply line 20 after passing back through the humidifier.

In the related art, pressure sensors were disposed at the inlet and outlet of the fuel cell 10 of the hydrogen circulation line 60 and at the inlet and outlet of the fuel cell 10 of the air supply line 20. However, the other pressure sensors except for the pressure sensor 70 at the inlet of the fuel cell 10 of the hydrogen circulation line 60 are all eliminated in the present disclosure and pressures are estimated through a modeling estimator and adjusted based a map stored in advance. Accordingly, whether the air pressure state of the air supply line 20 is normal may be indirectly determined. A method of determining whether the air pressure state of the air supply line is normal overlaps the control method described above, so it is not described in detail herein.

Although the present disclosure has been described and illustrated with reference to the particular embodiments thereof, it will be apparent to those skilled in the art that various improvements and modifications of the present disclosure can be made without departing from the technical idea of the present disclosure provided by the following claims.

What is claimed is:

1. An air supply control method of a fuel cell, comprising:
   adjusting, by a controller, an opening of a pressure control valve in accordance with an opening map stored in advance, wherein the pressure control valve is disposed at a fuel cell outlet of an air supply line for supplying air to the fuel cell and discharging air and adjusts air pressure in the air supply line;
   determining, by the controller, whether an air pressure state of the air supply line is normal after adjusting the opening of the pressure control valve; and
   operating, by the controller, the pressure control valve at a predetermined opening in response to determining that the air pressure state of the air supply line is abnormal,
   wherein in the determining of the air pressure state of the air supply line, whether an air compressor supplying air to the air supply line normally operates is determined based on a performance map stored in advance, and
   wherein the performance map stored in advance is a rotational speed map of the air compressor according to external air temperature and a required amount of air.

2. The method of claim 1, further comprising:
   starting, by the controller, a fuel cell system in a cold state and operating the fuel cell system in a cold driving mode before adjusting the opening of the pressure control valve in accordance with the opening map stored in advance.

3. The method of claim 2, wherein in the operating in the cold driving mode, the pressure control valve is operated at the predetermined opening.

4. The method of claim 2, further comprising:
   determining, by the controller, whether to adjust the opening of the pressure control valve in accordance with the opening map stored in advance based on an operation temperature of the fuel cell, after operating in the cold driving mode.

5. The method of claim 1, wherein in the adjusting of the opening of the pressure control valve in accordance with the opening map stored in advance, the opening map is stored based on air pressure in the air supply line that optimizes efficiency of the fuel cell system.

6. The method of claim 1, wherein in the determining of whether the air pressure state of the air supply line is normal, when a difference between a current rotational speed of the air compressor and a rotational speed according to the performance map is greater than a predetermined difference range, the air pressure state of the air supply line is determined to be abnormal.

7. The method of claim 1 further comprising:
   stopping, by the controller, the cold operation mode and entering a normal operation mode when the air pressure state of the air supply line is determined to be normal.

8. The method of claim 1, wherein in the operating of the pressure control valve at the predetermined opening, the predetermined opening is a maximum opening of the pressure control valve.

* * * * *